June 28, 1949.  G. L. SMITH  2,474,284
TIRE GUARD
Filed Jan. 23, 1947

Guy L. Smith INVENTOR.

BY
Victor J. Evans & Co.
ATTORNEYS

Patented June 28, 1949

2,474,284

UNITED STATES PATENT OFFICE 2,474,284

TIRE GUARD

Guy L. Smith, Cumberland, Md.

Application January 23, 1947, Serial No. 723,702

1 Claim. (Cl. 280—160)

This invention relates to improvements in tire protectors for motor vehicles, and more particularly to the provision of a device for removing objects from the front of the rear wheels of a motor vehicle to prevent the tires from being punctured.

It has been found that most punctures in pneumatic tires of motor vehicles are in the rear tires, due to the fact that the front tires strike objects lying in the road, and kick the object back, tumbling it end over end into the path of the rear tire. Thus sharp pointed objects are often presented to the rear tires, resulting in punctures.

It is, therefore, an object of this invention to provide a deflector which can be mounted in the rear of the front tire to deflect objects from the path of the rear tire.

A further object is to provide a deflector which can be quickly and conveniently attached to the steering arm of a motor vehicle, so that it can be positioned in the rear of the front wheel tire to deflect objects outwardly.

These and other objects are attained by the novel construction and arrangement of parts hereinafter described and illustrated by the accompanying drawings, forming a part hereof, and in which.

Figure 1:
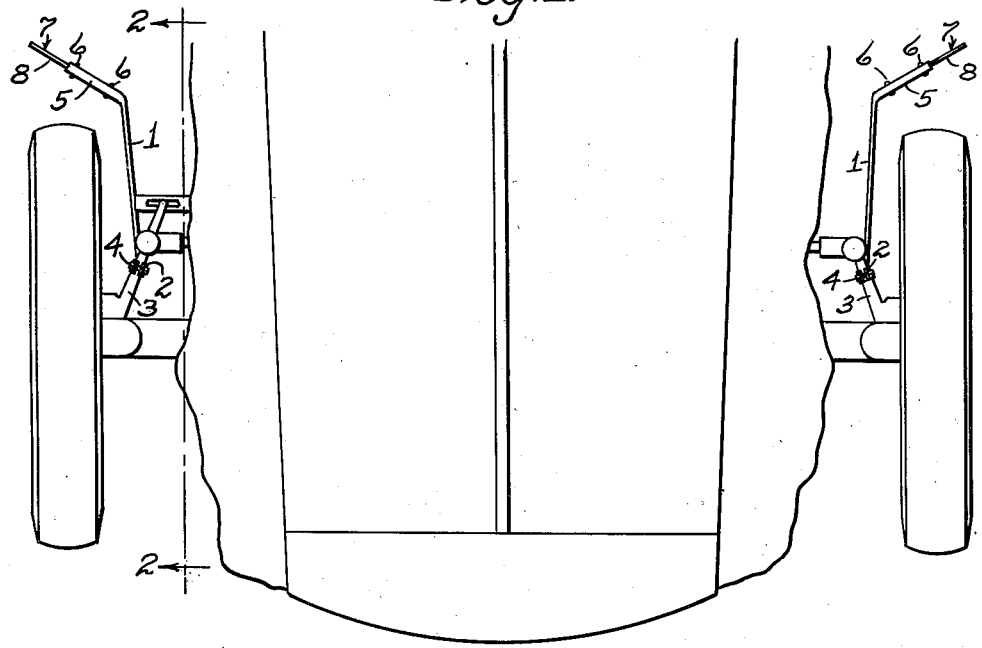
Figure 1 is a plan view showing the device attached to a motor vehicle.
Figure 2:
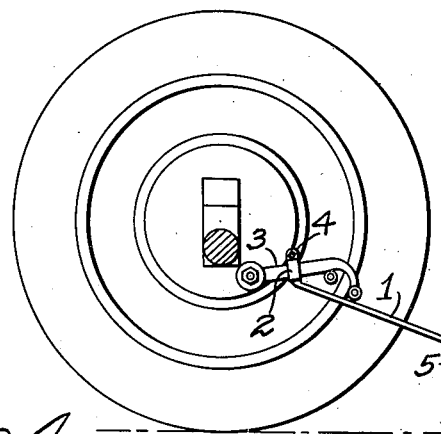
Figure 2 is a side elevational view of the device.
Figure 3:
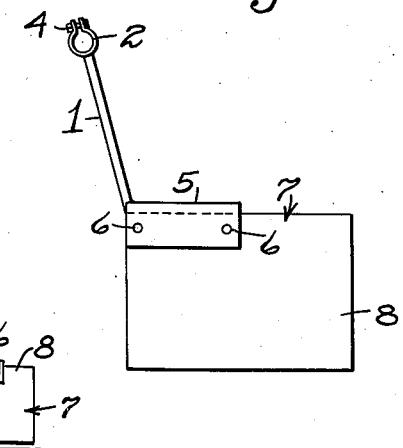
Figure 3 is a front elevational view of the device.

Referring to the drawings, the deflecting device is shown to comprise an arm 1 having at one end a bow type of clamp 2 by means of which it can be secured to the steering arm 3 of a motor vehicle by tightening the screw 4.

Integral with or otherwise securely attached to the lower end of arm 1 is a channel 5 to which is secured, by means of rivets 6 or similar means, a rectangular flexible sheet or flap 7. The channel extends only part way across the upper edge of the flap 7, leaving a free portion 8 so that no damage will be done to the device should it strike an object while the vehicle is being backed, or strike a rather large object which cannot be easily deflected.

The flap can be made of rubber, or it can be made of a heavy fabric, or similar materials.

The deflector is mounted so that it is in the rear of the front tire, and at an angle directed outwardly and rearwardly, and not extending beyond the outer edge of the tire. This mounting prevents contact of the deflector with any object which is not encountered by the front tire.

The arm 1 is long enough to allow sufficient clearance between the tire and the deflector when the vehicle is backed to prevent any large object being caught between them. The deflector's lower edge is about ½ inch above the pavement, or at a sufficient height so that it will not scrape against the pavement and yet be able to deflect objects from the path of the rear tire.

The channel 5 extends from the inner edge of the flap 7 to about the vertical center of the flap, leaving about one-half of the flap for the free portion 8 thereof.

Figure 4:
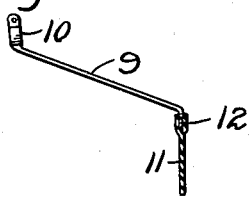
Figure 4 is a modified form of the invention partly in section.

In Figure 4, the arm 9 is provided with a clamp 10, but instead of using the channel 5 for connecting the flap 11 to the arm, the flap is vulcanized about the outstanding portion 12 of the arm, which replaces the channel 5. Thus a one piece device is formed, that is as efficient as that previously described, but is more inexpensive to manufacture.

It will be seen that there has been provided a simple and effective device for deflecting objects from the path of a rear tire, which device can be conveniently attached to the steering arm of a motor vehicle without in any way interfering with the operation thereof.

The above description is to be considered as illustrative and not limitative of the invention, of which modifications can be made without departing from the spirit and scope of the invention, as set forth in the appended claim.

The invention having been described, what is claimed is:

In a deflector for a motor vehicle, an arm, a clamp rigid with the arm at one end thereof and disposed at an angle to the arm, said clamp adapted to be attached to a steering arm, a channel rigid with the other end of the arm, said channel being disposed at an angle to the arm to extend outwardly of the arm when said clamp is attached to said steering arm, a flexible sheet fixed to the channel, said channel extending from the inner edge of the sheet to substantially the vertical center of the sheet, said sheet due to the angularity of the channel is arranged at an angle to the line of travel of the vehicle with the sheet being directed outwardly and rearwardly and not extending beyond the outer edge of the vehicle.

GUY L. SMITH.

REFERENCES CITED

The following references are of record in the file of this patent:

UNITED STATES PATENTS

| Number | Name | Date |
| --- | --- | --- |
| 1,007,878 | Krell | Nov. 7, 1911 |
| 1,178,680 | Rosenthal | Apr. 11, 1916 |
| 1,266,866 | Scognamillo | May 21, 1918 |
| 2,038,234 | Olen | Apr. 21, 1936 |